(12) United States Patent
Denys

(10) Patent No.: US 7,905,333 B2
(45) Date of Patent: Mar. 15, 2011

(54) BRAKE INSULATOR FOR DISC BRAKE PADS

(75) Inventor: Eric Denys, Ann Arbor, MI (US)

(73) Assignee: Material Sciences Corporation, Elk Grove, IL (US)

( * ) Notice: Subject to any disclaimer, the term of this patent is extended or adjusted under 35 U.S.C. 154(b) by 309 days.

(21) Appl. No.: 11/463,092

(22) Filed: Aug. 8, 2006

(65) Prior Publication Data

US 2008/0035434 A1    Feb. 14, 2008

(51) Int. Cl.
*F16D 65/092* (2006.01)
(52) U.S. Cl. ............... 188/73.37; 188/250 E; 188/250 B
(58) Field of Classification Search ............ 106/36; 188/73.1, 73.36, 73.37, 250 R, 250 E, 250 B, 188/251 A, 251 R
See application file for complete search history.

(56) References Cited

U.S. PATENT DOCUMENTS

| | | | | |
|---|---|---|---|---|
| 3,918,555 A * | 11/1975 | Rath | ............ | 188/73.37 |
| 4,042,085 A * | 8/1977 | Bjerk et al. | ............ | 188/251 A |
| 4,162,900 A * | 7/1979 | Judd | ............ | 428/325 |
| 5,099,962 A | 3/1992 | Furusu et al. | | |
| 5,515,950 A * | 5/1996 | Kwolek | ............ | 188/250 E |
| 5,660,251 A | 8/1997 | Nishizawa et al. | | |
| 6,041,893 A * | 3/2000 | Ervens et al. | ............ | 188/250 E |
| 6,105,736 A * | 8/2000 | Akita et al. | ............ | 188/73.37 |
| 2003/0213658 A1 * | 11/2003 | Baba | ............ | 188/73.37 |
| 2004/0188190 A1 * | 9/2004 | Niwa et al. | ............ | 188/73.37 |
| 2006/0289250 A1 * | 12/2006 | Dobrusky et al. | ............ | 188/73.37 |

FOREIGN PATENT DOCUMENTS

DE      4307344 A1 * 9/1994

* cited by examiner

*Primary Examiner* — Thomas J Williams
(74) *Attorney, Agent, or Firm* — Quinn Law Group, PLLC

(57) ABSTRACT

An insulator is provided having opposing first and second sides and adapted for placement between a brake pad and one of a piston and caliper of a disc brake system. The insulator includes first and second metal layers. A viscoelastic layer is disposed between, and spans substantially the entirety of the first and second metal layers. A friction enhancing coating is disposed on at least one of the first and second sides. The friction enhancing coating preferably includes a plurality of particles, such as generally spherical glass beads.

12 Claims, 1 Drawing Sheet

BRAKE INSULATOR FOR DISC BRAKE PADS

TECHNICAL FIELD

This invention relates to brake insulators or shims for a disc brake system.

BACKGROUND OF THE INVENTION

Modern automotive braking systems may be grouped into two basic categories, disc brakes and drum brakes. Of the two systems, disc brakes offer higher performance, simpler design, lighter weight, self-adjustability, and better resistance to water interference. Drum brakes have a greater number of parts than disc brakes and are therefore more difficult to service, but they are less expensive to manufacture, can easily incorporate an emergency brake system, and provide adequate braking force.

When a forward-moving vehicle brakes, the pitching motion of the vehicle creates a dynamic shift in the vehicle weight toward the front wheels. Therefore, it is necessary to have a highly effective braking system located at the front wheels of the vehicle. Accordingly, many of vehicles produced today have disc brakes on the front wheels and drum brakes at the rear wheels. Almost certainly, for as long as there have been braking systems in general use, there have been objectionable noises produced by these systems that engineers have attempted to eliminate.

The main components of a disc brake system are the rotor or disc, caliper, piston, and pads. The brake pads have a frictional lining supported by a rigid backing plate. The caliper holds the brake pads in proximity to the rotor and has at least one integrally mounted piston. Upon activation of the braking system, the piston urges the pad against the brake rotor thereby creating the frictional force necessary to slow the vehicle. Disc brake systems can further be subdivided into two subgroups, the floating-type caliper and the fixed-type caliper. The floating-type caliper contains at least one piston that presses the brake pad firmly against the rotor upon activation of the braking system. This movement creates a reaction force that causes the caliper to slide on pins thereby bringing the second brake pad into contact with the brake rotor. The fixed caliper design contains at least two pistons, one on each side of the rotor, each of which urges their respective brake pads into contact with the brake rotor while the caliper remains in a fixed position. The floating caliper system is the most widely used system on modern vehicles due to their lower cost and higher reliability relative to that of fixed calipers.

Both fixed and floating caliper disc brake systems may suffer from an objectionable noise termed "brake squeal" when a braking force is applied. This condition, especially at high frequencies, occurs whenever two or more of the brake components match in their dynamic behavior and couple together as a new system. In most cases, the brake pad resonances match with those of the brake rotor both in frequency and in wavelength. As a result, the brake pad will begin to vibrate in-phase with the rotor as a new system with very little damping. If the level of damping in the new system is lower than necessary to dissipate the input energy from the friction forces during braking, the amplitude of vibration of the new system will increase until the system becomes unstable leading to "brake squeal". Therefore, by increasing the damping in the newly coupled system, the system can be maintained in a stable condition since it can dissipate more energy than is being introduced from the frictional forces. Since both the rotor and pad are vibrating together in-phase, the addition of damping to either component will tend to damp the system. However, due to the high temperature of the rotor in operation, many of the applications have been limited to adding damping to the pad.

Many inventors have attempted to alleviate the noise problem that may be encountered with disc brakes.

U.S. Pat. No. 5,660,251 issued to Nishizawa et al. on Aug. 26, 1997, discloses a disc brake damping mechanism that detects vibrations of the brake rotor by a piezoelectric element pressed against the backing plate of one on the brake pads. The detection signal is input to a control circuit, which then applies a control signal to another piezoelectric element that produces oscillations having a frequency operable to reduce the detection signal to zero. This active damping system may be more costly to implement than that of a passive system, and may not be economically viable for large-scale use on commercially produced vehicles.

U.S. Pat. No. 5,099,962 issued to Furusu et al. on Mar. 31, 1992, discloses a disc brake backing plate with two layers of viscoelastic material disposed between three metal plates forming a constrained layer viscoelastic laminate to form a brake pad isolator or shim. Although constrained layer damping treatments have been found to be effective, in most cases there is still a need to introduce additional damping to the system.

SUMMARY OF THE INVENTION

An insulator is provided having opposing first and second sides and adapted for placement between a brake pad and one of a piston and caliper of a disc brake system. The insulator preferably includes a first and a second metal layer. A viscoelastic layer is disposed between, and spans substantially the entirety of the first and second metal layers. A friction enhancing coating is provided on at least one of the first and second sides. The friction enhancing coating preferably includes a plurality of particles. The plurality of particles may be generally spherical glass beads having an average diameter between 55 and 135 microns. The plurality of particles may be contained within an epoxy based binder. A disc brake system incorporating the disclosed insulator is also provided.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a cross sectional view of an alternate embodiment of the insulator shown in FIG. 2a; and FIG. 4 is a cross sectional view of an alternate embodiment of the insulator shown in FIG. 2a.

DESCRIPTION OF THE PREFERRED EMBODIMENTS

The following description of the preferred embodiments should not be construed to limit the invention. For purposes of clarity, the same reference numbers will be used within the several figures to identify similar components.

Figure 1:
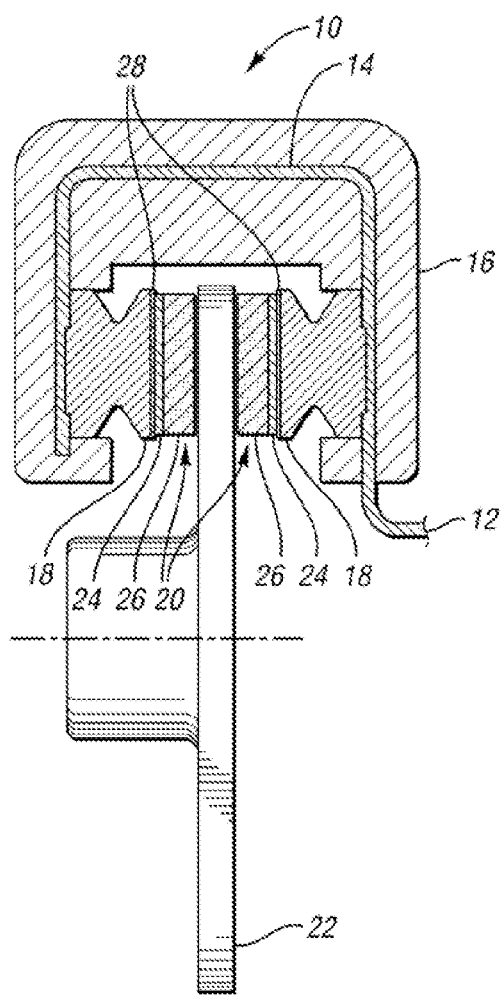
FIG. 1 is a front schematic sectional view of a typical fixed caliper disc brake system illustrating brake pads selectively engageable with a rotor.

FIG. 1 is a front schematic sectional view of a typical disc brake system 10. The disc brake system 10 illustrated is of a fixed caliper design. However, the present invention may be applied to a sliding or floating caliper system while maintaining the inventive concept. In operation, fluid within a hydraulic line 12 will pressurize hydraulic cavities 14 contained within a caliper 16. This in turn forces pistons 18 disposed on each respective side of the caliper 16 to urge brake pads 20 intro frictional engagement with a brake rotor 22. The brake pads 20 are characterized by a brake pad backing plate 24 of sufficient rigidity to support a frictional liner 26. The frictional liner 26 is the element of the brake pad 20 that contacts the brake rotor 22 providing the frictional force necessary to slow the vehicle. This frictional engagement may lead to vibrations of the brake pad 20, a phenomenon that may cause an objectionable noise to be emitted by the disc brake system 10. Engineers have attempted to attenuate this noise by placing an insulator or shim 28 between the piston 18 and the brake pad backing plate 24. The structure of the insulator 28 will be discussed in greater detail with reference to FIGS. 2 and 2a. The hydraulic disc brake system 10 is merely exemplary, and is not meant to limit the scope of the present invention. Those skilled in the art will realize that the disc brake system 10 may be actuated in other ways including pneumatic, mechanical, and electro-mechanical actuation.

Figure 2:
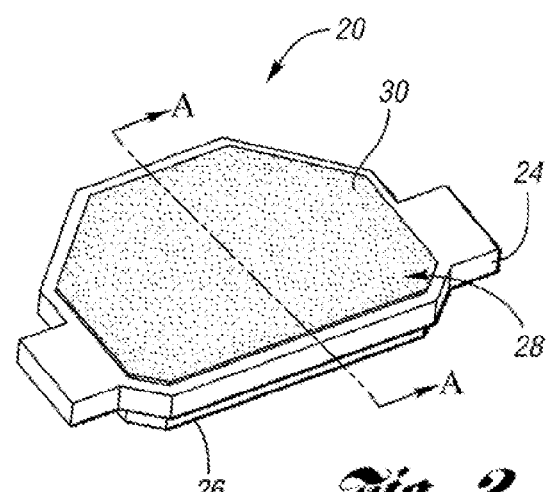
FIG. 2 is a perspective view of a typical disc brake pad and insulator or shim.
Figure 2A:
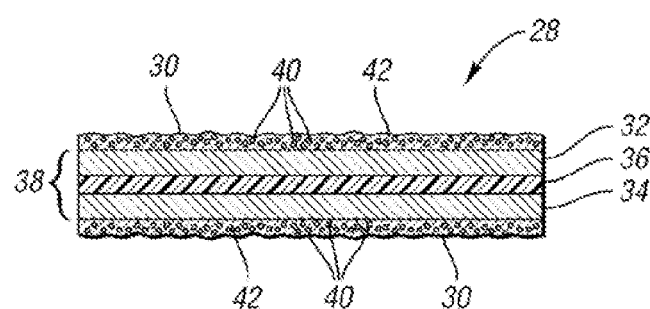
FIG. 2a is a cross sectional view, taken along line A-A of FIG. 2, of the insulator shown in FIG. 2.

FIG. 2 is a perspective view of a brake pad 20 having an insulator 28 consistent with the preferred embodiment. The insulator 28 of the present invention includes a friction enhancing coating 30 operable to increase the coefficient of friction of the insulator 28. Referring now to FIG. 2a, and with continued reference to FIGS. 1 and 2, there is shown a cross sectional view of the insulator 28 of the present invention taken along line A-A of FIG. 2. The insulator 28 includes a first metal layer 32 and a second metal layer 34. The first and second metal layers 32 and 34 are preferably formed from steel or stainless steel. A viscoelastic layer 36 is disposed between the first and second metal layers 32 and 34 and preferably spans substantially the entirety of each of the first and second metal layers 32 and 34. As such, the first and second metal layers 32 and 34 and the viscoelastic layer 36 cooperate to form a constrained layer viscoelastic laminate 38 operable to provide a measure of damping to the brake system 10 through shear deformation of the viscoelastic layer 36.

Additionally, the friction enhancing coating 30 may be provided on each of the first and second metal layers 32 and 34. The friction enhancing coating 30 provides an additional measure of damping to the disc brake system by increasing the frictional resistance between the insulator 28 and at least one of the brake pad 20 and the piston 18. The friction enhancing coating 30 includes a plurality of particles 40, which in the preferred embodiment are generally spherical glass beads having an average diameter between approximately 55 to 135 microns and a maximum diameter of approximately 150 microns. Those skilled in the art will recognize that a micron generally refers to one thousandth of a millimeter. Additionally those skilled in the art will recognize that other materials may be suitable for the plurality of particles 40 such as silica sand, metal particles, polymers, ceramic dust, etc., while remaining within the scope of that which is claimed. In the preferred embodiment, the friction enhancing coating 30 includes a binder 42 operable to contain the plurality of particles 40 and to bond the plurality of particles 40 to the surfaces of the first and second metal layers 32 and 34. The preferred material for binder 42 is epoxy based; however, those skilled in the art will recognize that other materials, such as oil-based paints, with the requisite heat and chemical resistance may be used while remaining within the scope of that which is claimed. Additionally, the relative thicknesses of the first and second metal layers 32 and 34, the viscoelastic layer 36 and the friction enhancing coating 30 as illustrated in FIG. 2a are merely exemplary and are not meant to limit the scope of that which is claimed. Further, the insulator 28 may have additional metal layers than the first and second metal layers 32 and 34 and additional viscoelastic layers than the viscoelastic layer 36 while remaining within the scope of that which is claimed.

Figure 3:
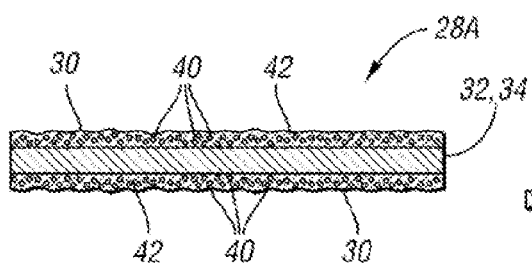

Referring now to FIG. 3, there is shown an alternate embodiment of the insulator 28, shown in FIG. 2a, generally indicated as 28A. The insulator 28A includes only one metal layer 32 or 34 having the friction enhancing coating 30 provided on opposing sides of the metal layer 32 or 34. The insulator 28A is operable to provide only frictional damping to the disc brake system 10. Those skilled in the art will recognize that the friction enhancing coating 30 may be provided on only one of the opposing sides of the metal layer 32 or 34 while remaining within the scope of that which is claimed.

Figure 4:
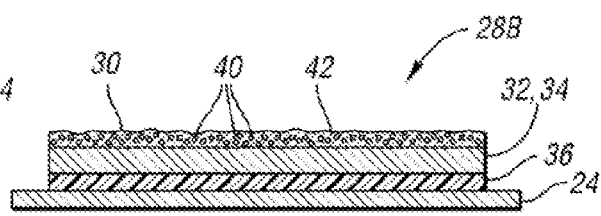

Referring now to FIG. 4, there is shown yet another embodiment of the insulator 28, shown in FIG. 2a, generally indicated as 28B. The insulator 28B includes one metal layer 32 or 34 bonded to and spanning substantially the entirety of the viscoelastic layer 36. Additionally, the viscoelastic layer 36 is in touching contact with the brake pad backing plate 24. The viscoelastic layer 36 may be bonded to the brake pad backing plate 24, but need not be. The friction enhancing coating 30 is provided on the metal layer 32 or 34 on the side opposite the viscoelastic layer 36, such that the insulator 28B to provide a measure of damping through shear deformation of the viscoelastic layer 36 and frictional damping through the use of the friction enhancing coating 30.

While the best modes for carrying out the invention have been described in detail, those familiar with the art to which this invention relates will recognize various alternative designs and embodiments for practicing the invention within the scope of the appended claims.

The invention claimed is:

1. An insulator adapted for placement between a brake pad and one of a piston and caliper of a disc brake system, the insulator comprising:
   a first metal layer having a first surface and a second surface opposite said first surface;
   a second metal layer having a first surface and a second surface opposite said first surface;
   a viscoelastic damping layer provided on said second surface of said first metal layer and said first surface of said second metal layer; and
   a friction enhancing coating provided on said first surface of said first metal layer and said second surface of said second metal layer and including;
      an epoxy based binder; and
      a plurality of particles contained and encased entirely within said epoxy based binder and having a minimum diameter of approximately 55 microns;
   wherein said friction enhancing coating is operable to increase the coefficient of friction of said first surface of said first metal layer and said second surface of said second metal layer.

2. The insulator of claim 1, wherein said plurality of particles consists essentially of one of silica sand, metal particles, polymers, and ceramic dust.

3. The insulator of claim 1, wherein said plurality of particles are generally spherical glass beads.

4. The insulator of claim 1, wherein said plurality of particles are generally spherical glass beads having an average diameter of from approximately 55 to 135 microns.

5. The insulator of claim 1, wherein said plurality of particles are generally spherical glass beads having a maximum diameter of approximately 150 microns.

6. The insulator of claim 1, wherein said first metal layer is formed from one of steel and stainless steel.

7. The insulator of claim 1, wherein said second metal layer is formed from one of steel and stainless steel.

8. A disc brake system comprising:
 a caliper defining a cylinder;
 at least one piston contained within said caliper;
 a rotor rotatable with respect to said caliper;
 a pad operable to frictionally engage said rotor;
 wherein said at least one piston is operable to selectively effect frictional engagement between said pad and said rotor;
 an insulator, having first and second opposing sides, provided between said pad and one of said caliper and said at least one cylinder, wherein said insulator is formed from a first and second metal layer having a viscoelastic material disposed therebetween; and
 a friction enhancing coating provided on at least one of said first and second sides to increase the coefficient of friction of said at least one of said first and second sides and including:
 an epoxy based binder; and
 a plurality of particles contained and encased entirely within said epoxy based binder and having a minimum diameter of approximately 55 microns.

9. The disc brake system of claim 8, wherein at least one of said first and second metal layers is formed from one of steel and stainless steel.

10. The disc brake system of claim 8, wherein said plurality of particles consists essentially of one of silica sand, metal particles, polymers, and ceramic dust.

11. The disc brake system of claim 8, wherein said plurality of particles are generally spherical glass beads.

12. The disc brake system of claim 8, wherein said plurality of particles are generally spherical glass beads having an average diameter of from approximately 55 to 135 microns.

* * * * *